Nov. 13, 1956   R. C. BABISH   2,770,758
RELAY CIRCUIT
Filed Nov. 26, 1945

INVENTOR
RICHARD C. BABISH
BY M.O.Hayes
ATTORNEY

United States Patent Office 2,770,758
Patented Nov. 13, 1956

2,770,758
RELAY CIRCUIT

Richard C. Babish, Boston, Mass., assignor, by mesne assignments, to the United States of America as represented by the Secretary of the Navy Application November 26, 1945, Serial No. 630,946

6 Claims. (Cl. 317—140)

This invention relates in general to control apparatus and more particularly an electrical circuit responsive to selected signals for controlling the operation of a camera.

In radar systems objects are often presented in polar form upon the face of a cathode ray tube known as a plan position indicator or P. P. I. The sweep of such an indicator is radial and the direction thereof relative to a fixed position upon the face of the tube corresponds to the direction of the radar antenna. A complete scan occurs during one revolution of the transmitting antenna.

In airborne equipment a motion picture camera is frequently utilized intermittently to photograph the face of the plan position indicator. In order properly to understand the photographs of the plan position indicator, it has been found advisable to correlate these with corresponding aerial photographs. Both the aerial and radar cameras are electrically triggered by an electrical impulse of suitable duration generated by switching apparatus associated with the plan position indicator. The frequency at which these photographs are taken is determined by the interval between the aforementioned triggering pulses, and generally arranged so that a triggering pulse occurs once every twenty complete scans of the antenna.

It has been observed that the automatic arrangement for triggering both aerial and radar P. P. I. cameras at a regular predetermined rate provided at times much unnecessary photographic data, and at other times failed to provide a specific desired photograph.

It is therefore a primary object of my present invention to provide a control circuit for radar-aerial photography having extreme flexibility.

Another object of my present invention is to provide a control circuit for a camera responsive to camera triggering pulses in a manner to be determined by the operator of the equipment.

It is a further object of my invention to provide a control circuit for a camera responsive in a selected manner to all triggering pulses or to alternate triggering pulses and which further permits manual control independent of triggering pulses.

These and other objects of the present invention will now become apparent from the following details specification taken in connection with the accompanying drawing, in which.

Figure 1:
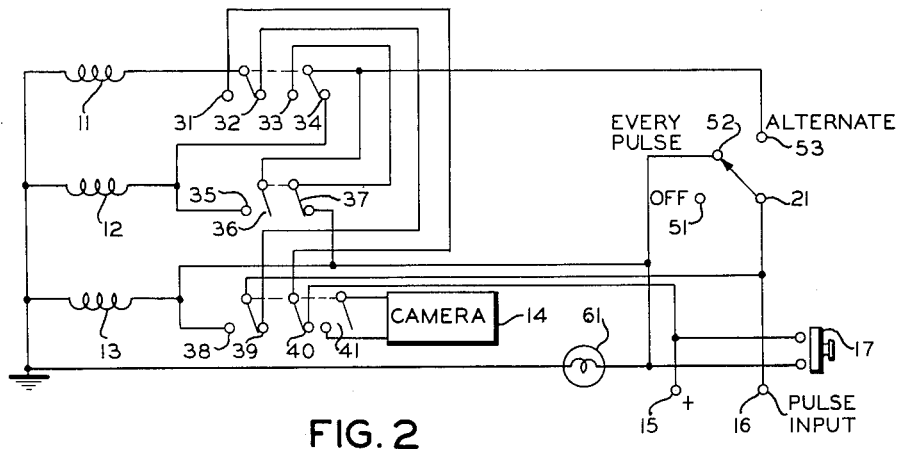
Fig. 1 is a circuit diagram of the novel control circuit.

The control circuits illustrated all utilize a combination of three switching elements or control relays 11, 12, and 13, having a plurality of contacts associated therewith. An electromechanical device, specifically a camera 14 is triggered by the control circuit in a selected manner to be hereinafter described. The camera 14 is utilized to photograph, when triggered, the face of a cathode ray tube plan position indicator, not shown. As an example of a camera adapted for radar photography, reference is made to the one-time copending application, now abandoned, of Stanley D. Hunt, Serial No. 597,034, filed June 1, 1945, and entitled "Mechanical Device." The aerial camera not shown in the drawing is triggered in synchronism with the radar camera 14.

The control system illustrated in Fig. 1 is energized from a positive voltage source as terminal 15 and is further energized by a plurality of trigger pulses applied at terminal 16 and generated at a predetermined submultiple of the scanning rate. For control purposes, the equipment operator may trigger the camera manually by a push button 17, and for automatic operation a selector switch 21 is provided and may be adjusted so that the camera 14 is triggered by all pulses applied at terminal 16 or by alternate pulses applied thereat.

In the figures, all the relays are shown in the normally deenergized position. When a relay is energized, the ganged contact arms thereof reverse their position, open the circuits now completed and close the circuits of the oppositely disposed contacts, if present. As may be readily apparent from the circuit diagram of Fig. 1, closure of the manual push button 17 will complete a circuit and energize the relay coil 13 directly from the positive power source 15. The movement of the contact arms associated with relay 13 will cause contact 41 to close, and in a manner herein not illustrated, will initiate the operation of the radar camera 14. The "manual photograph" push button 17 is independent of other circuits, and relays 11 and 12 remain unaffected during such operation.

If the selector switch 21 is in the off position 51, the pulses applied at terminal 16 will have no effect upon the camera 14. However, if the selector switch is rotated to position 52, each pulse applied at terminal 16 will trigger the camera 14. In the control system illustrated, the pulses supplied from the radar system and applied at terminal 16 are preferably of the order of a tenth of a second duration. Relay 11 is a short time delay relay commonly known as a "slug relay" and is adjusted for a time delay of the order of one-twentieth of a second for closure after being energized.

With the selector switch in position 52, there is direct connection from the pulse input terminal 16 through the switch and to the relay coil 13. In this instance, as in the manual control, the operation of relay 13 triggers the camera and the control signal applied thereto has no effect upon the other relays 11 and 12.

When the selector switch 21 is turned to the alternate pulse position 53, an incoming pulse at terminal 16 energizes relay 12 through normally closed contact 34 on relay 11, and further energizes relay 11 through normally closed contacts 39 and 32. The operation of the contact arms of relay 11 is delayed for one-twentieth of a second after which time contact 32 is open-circuited, breaking the circuit energizing relay 11. However, relay 11 is instantaneously re-energized by the closure of contact 31 thereof, the current flow then being from the positive power terminal 15 through the normally closed contact 40 and the now closed contact 31. In order for this operation to take place successfully the contacts 31 and 32 must be carefully adjusted so that the movable arm therebetween has comparatively little travel.

The operation of relay 11 opens contact 34 through which relay 12 was originally energized by the pulse. However, relay 12 remains energized and closed until the termination of the pulse applied at terminal 16, because in closing, relay arm 36 completes a circuit at contact 35 to terminal 53 and hence there is direct connection to the triggering pulse source, terminal 16. It is important to note that relay 13 would have been energized through contact 37 if relay 12 had not closed prior to relay 11. At the termination of the pulse applied at terminal 16, relay 12 is deenergized and returns its contacts to the position illustrated, but relay 11 remains closed because of the direct connection between its coil and the positive voltage source 15.

The application of the following pulse at terminal 16 energizes relay 13 through contact 33, now closed, and contact 37 and thereby operates the camera. The operation of relay 13 causes the contact arm to leave contact 39 and complete a circuit through contact 38 to the pulse terminal 16, which thereby maintains the energization of relay 13 for the period of the pulse. However, it is to be noted that contact 40 opens and thereby de-energizes relay 11 which in turn closes contact 34 and energizes relay 12. At the termination of this pulse applied at terminal 16, both relays 12 and 13 are de-energized and the circuit and contacts are returned to the condition illustrated and in readiness for a new cycle.

Summarizing, the operation of the circuit illustrated in Fig. 1, with the selector switch 21 in position 53, the first pulse applied causes the operation of the relays such that the succeeding pulse triggers the camera 14 for the picture. A pilot bulb 61 is shunted across the relay coil 13 thereby providing a visual indication that a picture has been recorded.

Figure 2:
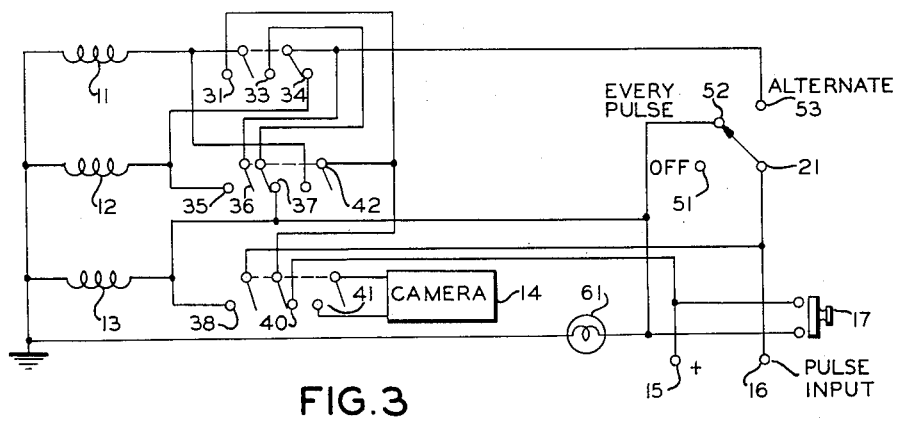
Fig. 2 is a circuit diagram of a modification of the control circuit illustrated in Fig. 1.

The principal disadvantage of the relay control circuit illustrated in Fig. 1 is the requirement of critical spacing of contacts 31 and 32 on relay 11. In Fig. 2 there is illustrated a similar combination of control elements which obviate the foregoing critical requirement. Inasmuch as many of the circuit elements and contacts illustrated in Fig. 2 are similar to those illustrated in Fig. 1, corresponding elements have been correspondingly numbered. The principal difference between the circuits of Figs. 1 and 2 is the addition of a pair of normally open contacts 42 to the relay 12, which as illustrated are connected directly in parallel with the contact 31, which when closed, seal the relay 11 to the positive power source 15 through the normally closed contact 40.

In the alternate pulse position 53, the first incoming pulse as applied at terminal 16 in Fig. 2 closes relay 12 so that contact 42 completes the circuit for relay 11 across the positive voltage source 15. Until the succeeding pulse arrives at terminal 16, relay 11 is energized from the positive source 15 through its own contact 31. As in the example of Fig. 1, this succeeding pulse will trigger the camera 14 by the closure of contact 41. The operation of the control circuit of Fig. 2 is in all other respects similar to the operation of that illustrated in Fig. 1.

Figure 3:
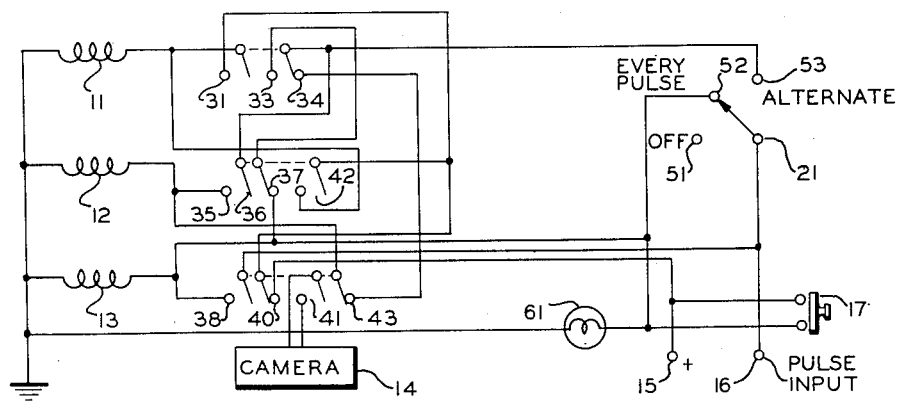
Fig. 3 is a circuit diagram of a further modification of the control circuit illustrated in Fig. 1.

In Fig. 3 there is illustrated a further modification of the circuits of Figs. 1 and 2. Again all elements which are common throughout the figures are correspondingly numbered. The principal difference between the circuits of Fig. 2 and Fig. 3 is the addition of a pair of normally closed contacts 43 to the relay 13. These contacts are in series with a circuit originating at the selector switch alternate terminal 53, through contact 34 and the relay coil 12. In operation the first pulse applied at terminal 16, with the selector switch on alternate, will energize relay 11 and relay 12. Relay 12 will be deenergized at the termination of the first pulse, but relay 11 will remain energized as described in connection with Fig. 1. The application of the succeeding pulse at terminal 16 will energize relay 13 to trigger the camera and by opening contact 43 preclude the energization of relay 12. It will thus be apparent that on alternate pulses, the relays 12 and 13 will operate alternately and thereby provide separate control circuits for various apparatus to be controlled on alternate pulses. It will of course be apparent that for control circuits other than those illustrated in the figures additional control contacts may be added to the relays 11, 12 and 13, to determine the flow of power from various other sources to other equipment.

Inasmuch as various modifications and extensions of the principle hereinabove disclosed may now become apparent to those skilled in the art, I prefer that the present invention be defined solely by the spirit and scope of the appended claims.

What is claimed is:

1. In a control system responsive to an input signal of recurrent, intermittent electrical pulses to control a device mechanically operative when electrically energized and adapted for selectively energizing said device with all of said signal pulses or with alternate signal pulses, apparatus comprising a source of power, three normally de-energized electrically interlocked contact carrying relays, the first of said relays having a time delay equal to a fraction of the time duration of a signal pulse, means responsive to a first signal pulse to energize said first and second relays, means controlled by said energized second relay to hold said second relay energized for the time duration of a first signal pulse, means controlled by said first relay on being energized by said first signal pulse and operative after said time delay in connection with said power source to hold said first relay energized after said first signal pulse, and to energize the third of said relays upon the application of a second signal pulse through the contacts of said energized first relay, means controlled by said energized third relay to energize said device for the time duration of said second signal pulse and to de-energize said first relay, said second relay and said first relay time delay precluding the energization of said third relay by said first signal pulse.

2. Apparatus as in claim 1 and including a switch operative independently of said input signal pulses to complete a circuit shunting said first and second relay contacts to energize said third relay directly whereby said third relay is operative with the application of each input signal pulse to energize said device for the time duration of said pulse.

3. Apparatus as in claim 1, wherein the energization of said second relay connects said first relay to said power source.

4. Apparatus as in claim 1, and including contacts on said third relay in said second relay circuit, whereby said second and third relays are operative on alternate signal pulses.

5. In combination, an electrically energized camera shutter, a source of timing pulses and three normally de-energized relays, the first of said relays being of the time delay type, means to energize said time delay relay and the second of said relays in response to a first timing pulse, means controlled by said energized second relay to hold said second relay energized for time duration of said timing pulse, means controlled by said energized first relay to hold said first relay energized after termination of said timing pulse, means controlled by said energized said first relay to hold said second relay deenergized and to energize the third of said relays in response to a second timing pulse, means controlled by said energized third relay to hold said third relay energized for the time duration of said second timing pulse, to deenergize said first relay, to energize said second relay, to energize said camera shutter and to restore said three relays to a deenergized state upon termination of said second timing pulse.

6. Apparatus as in claim 5 and including switch operative independently of said input timing pulses to complete a circuit shunting said first and second relay control means to energize said third relay directly, whereby said third relay is responsive to the application of each timing pulse to energize said camera shutter for the time duration of each of said pulses.

References Cited in the file of this patent
UNITED STATES PATENTS

| 2,166,090 | Cooper | July 11, 1939 |
| 2,293,932 | Cooper | Aug. 25, 1942 |
| 2,416,070 | Shively | Feb. 18, 1947 |
| 2,416,652 | Stevens | Feb. 25, 1947 |